L. H. CORMIER.
ROLLER BEARING.
APPLICATION FILED OCT. 10, 1916.

1,222,534.

Patented Apr. 10, 1917.
2 SHEETS—SHEET 1.

INVENTOR
Leo H. Cormier
By Lancaster and Allwine
his ATTORNEYS

L. H. CORMIER.
ROLLER BEARING.
APPLICATION FILED OCT. 10, 1916.

1,222,534.

Patented Apr. 10, 1917.
2 SHEETS—SHEET 2.

INVENTOR
Leo H. Cormier
By Lancaster & Allwine
his ATTORNEYS

UNITED STATES PATENT OFFICE.

LEO H. CORMIER, OF BROOKLYN, NEW YORK.

ROLLER-BEARING.

1,222,534.  Specification of Letters Patent.  Patented Apr. 10, 1917.

Application filed October 10, 1916.  Serial No. 124,895.

*To all whom it may concern:*

Be it known that I, LEO H. CORMIER, a citizen of the United States, and a resident of Brooklyn, in the county of Kings and State of New York, have invented a certain new and useful Improvement in Roller-Bearings, of which the following is a specification.

The present invention relates to an improved bearing, adapted particularly for supporting spindles and shafts, such as used upon milling machines and lathes, and for much heavier work.

It is an object of the present invention to provide a bearing of this character which reduces or distributes friction or contact between the shaft or spindle and the casing or bearing which supports the spindle.

It is another object of the present invention to provide the roller bearing with pinions which may be constructed in one piece and provided with toothed portions and a smooth bearing portion, and which has bearing portions of different diameters and toothed portions of different diameters to provide for the relatively slow rotation of the pinions during the turning of the shaft.

It is the further aim of the invention to provide a bearing of this character wherein the casing or support is of novel construction and may be easily separated to permit of the assembly of the rollers or pinions and the spindle or journal portion of the shaft. In the bearing of this invention it is designed further, to provide roller bearing surfaces for supporting the shaft in the casing, and to provide gearing which mesh loosely and which are employed merely for the purpose of preventing the relative slipping movement of the pinions and the main roller bearings.

Other objects and advantages of this invention, as well as the above, will be more clearly brought out in the following specific description of the present preferred embodiment of the invention, the same being illustrated in the accompanying drawings wherein.

Figure 1:
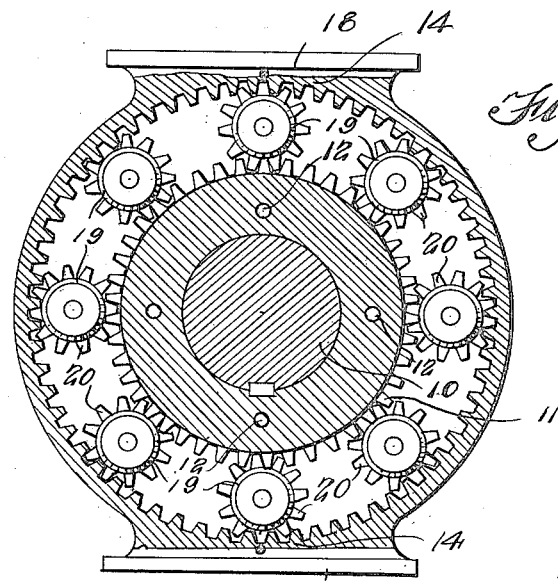
Figure 1 is a vertical transverse section taken through a bearing embodying the features of this invention, and disclosing a shaft mounted in the same.

Referring to these drawings, and first to the form disclosed in Figs. 1, 2 and 3, 10 designates a shaft or spindle adapted to be supported by the improved bearing. Keyed to the shaft 10 is a relatively large gear wheel 11. The gear wheel 11 is provided at its opposite sides with relatively large rollers 12 which are of substantially the same diameter as that of the gear wheel 11, and which are provided with hardened smooth peripheral supporting surfaces, the same being inclined toward each other at an angle of substantially fifteen degrees. The rollers 12 are secured by bolts 13, or the like to the gear 11 and are adapted to rotate therewith. By using this construction the shaft 10 may be of ordinary form as the gear wheel 11, which carries the rollers 12, is merely keyed thereto in the manner of an ordinary pulley or gear.

A three-part casing or bearing surrounds the shaft 10 and the rollers and the gear. The casing is made up of three rings 14, 15 and 16. The intermediate ring 14 is provided with an internal rack, and the end rings 15 and 16 are each provided with an internal smooth bearing surface, the surfaces of the end rings being inclined toward each other at an angle of substantially fifteen degrees. Bolts 17 or the like extend longitudinally through the rings 14, 15 and 16 to secure the same in assembled relation and provide a substantially rigid compact structure. The top and bottom of the assembled casing are provided with attaching flanges 18 by means of which the casing may be secured to a lathe, a milling machine, or secured to any other suitable support upon which the shaft 10 is adapted to be mounted.

Figure 3:
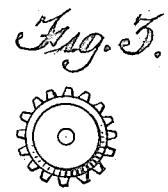
Fig. 3 is a detail side elevation of one of the pinions, enlarged.
Figure 2:
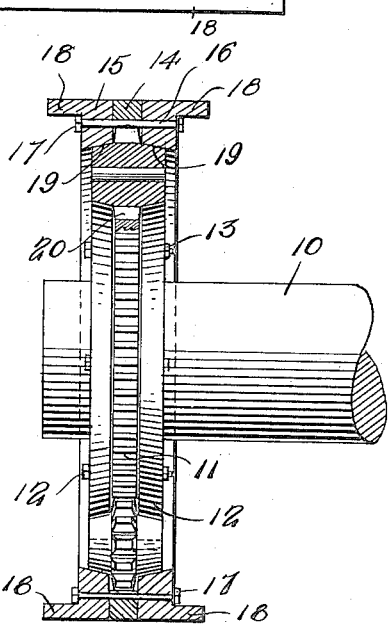
Fig. 2 is a longitudinal vertical section taken through the same, the parts carried by the shaft being shown in elevation.

Arranged, in planetary fashion, around the gear wheel 11 and the rollers 12, are a number of pinions or rollers, each of which is of the construction shown in Fig. 3. Each pinion is provided at its opposite ends with outwardly tapering bearing surfaces 19 adapted to bear flat against the inner surfaces of the rings 15 and 16, and the peripheral surfaces of the rollers 12. Radiating gear teeth 20 are formed upon each pinion between the end bearing surfaces 19, and are adapted to mesh with the internal rack 14, and the gear wheel 11. The bearing surfaces 19 are adapted to support the weight of the shaft 10, and the intermeshing teeth 20 of the pinions and the teeth of the rack 14 and the gear wheel 11 are merely for the purpose of preventing the slipping of the pinions upon the relatively smooth bearing surfaces. With this construction the pinions revolve at a speed of about one-half that of the shaft 10 which is supported thereby. The gear teeth prevent slipping of the pinions and thus offset any undue wear or friction between the parts.

To assemble, or separate the parts of this bearing it is only necessary to loosen the bolts 17 and remove one of the end rings, 15 or 16. The pinions may be placed in position upon the rollers 12 and in engagement with the teeth of the gear wheel 11, at the same time, the pinions are assembled within the internal rack 14. The end rings 15 and 16 are now clamped against the opposite sides of the internal rack 14, and the casing structure is secured rigidly together by means of the bolts 17.

In Figs. 4 to 7 inclusive of the accompanying drawings there is shown a modified construction of this bearing, wherein the principles of this invention are supported in a different structure. In this instance, the shaft 10 is provided with the gear wheel 11 which is keyed thereto. The gear wheel 11 is provided with a single roller 12$^a$ secured against one side of the gear wheel by bolts 13. This roller 12$^a$ is of substantially the same diameter as the gear wheel 11, and is provided with a smooth peripheral supporting surface at its periphery which is inclined at substantially fifteen degrees toward the gear wheel.

Figure 6:
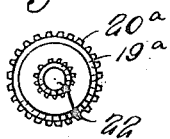
Fig. 6 is a detail view showing in side elevation one of the pinions of the modified construction.
Figure 5:
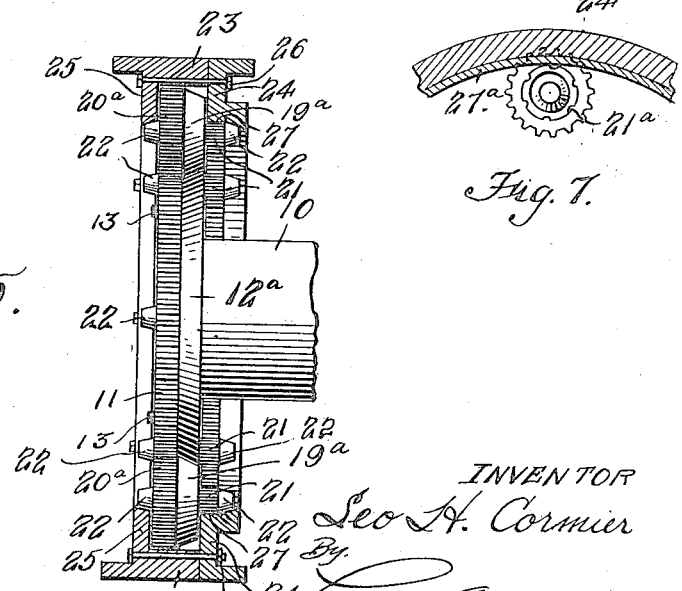
Fig. 5 is a longitudinal vertical section taken through the same, the pinions, and parts mounted on the shaft being shown in elevation.

Arranged in planetary fashion about the gear wheel 11 is a plurality of pinions, each of which is of the construction shown in Fig. 6. Each pinion has a toothed portion 20$^a$ adapted to mesh with the gear wheel 11, and is provided at one side of the toothed portion with an outwardly tapering smooth roller portion 19$^a$ adapted to bear against the roller 12$^a$. The pinion of Fig. 6 is provided, beyond the roller portion 19$^a$ thereof, with a relatively small pinion or toothed portion 21 of a diameter which is considerably less than that of the toothed portion 20$^a$ of the pinion. The opposite ends of the pinion are provided with outwardly tapering trunnions 22 of like diameter and adapted to support the pinions on the casing.

In this modified construction the casing comprises a body ring 23, and a side plate 24. The body ring 23 is of such internal size as to permit of the free movement of the pinions therein without contact with the casing. At one edge of the body ring 23 is provided an inwardly extending flange 25 having its inner edge hardened and inclined at substantially fifteen degrees to provide a support for the trunnion 22 on one end of each of the pinions. The side plate 24 is detachably secured to the body ring 23 by a plurality of longitudinally extending bolts 26. The side plate 24 is of ring form, and is flat. The inner edge of the side plate is provided with an internal rack 27 adapted to mesh with the relatively small pinion portion 21 of the roller. At one side of the rack 27 the plate 24 is provided with an inclined annular bearing face adapted to receive the opposite trunnion 22 of each pinion. The inclined face adjacent to the rack 27 is inclined toward the same at an angle of substantially fifteen degrees to hold the pinions from shifting laterally or longitudinally through the bearing. The pinion portion 21 is of substantially the same diameter as that of the trunnion portion 22, the pinion portion being employed to prevent the slipping of the trunnion upon the internal flat bearing surfaces of the body ring 23 and the side plate 24.

By virtue of this construction, the shaft 10 rotates at a relatively high speed as compared with the pinions or rollers, and consequently a high speed of the shaft may be maintained without undue friction or wear upon the rollers, or the heating of the bearings.

Figure 4:
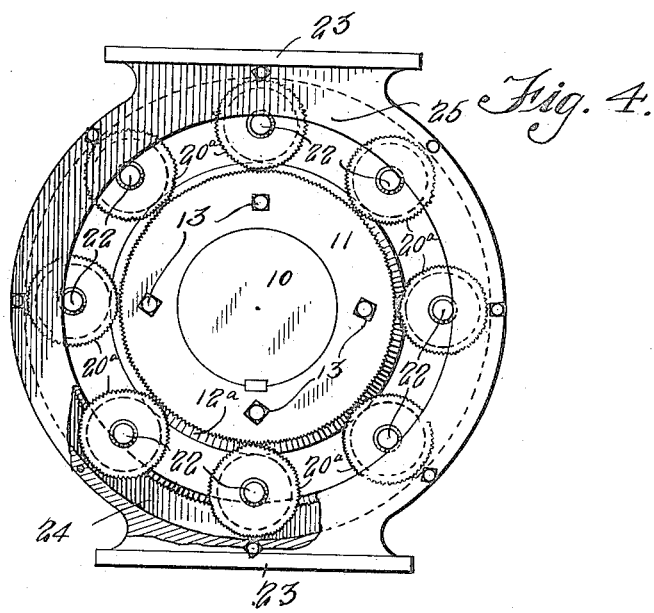
Fig. 4 is an end elevation of a modified form of bearing, parts of the same being shown in section.
Figure 7:
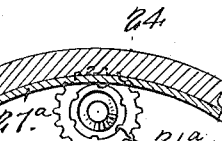
Fig. 7 is a fragmentary view of one side of the bearing, the view showing a modified mounting of the roller or pinion on the casing.

In Fig. 7 there is shown a slight modification in the construction shown in Figs. 3 and 4. The pinion of Fig. 6 may be provided, in lieu of the pinion portion 21, with a boss or hub provided with transverse oil grooves 21$^a$, and the side plate 24 may be provided, in lieu of the internal rack 27, with an inner ring or band 27$^a$ of rubber, or other yielding material. The resilient ring 27$^a$ is adapted to grip the pinion portion 21$^a$ with sufficient friction to prevent slipping of the pinions upon the bearing surfaces of the casing, and the surface of the roller 12$^a$.

In assembling, and separating the parts of the modified construction, it is only necessary to loosen the bolts 26 and remove the side plate 24 from the body ring 23. The pinions may now be assembled in planetary fashion about the gear wheel 11, either in the body ring 23, or in the side plate 24. The opposite member of the casing is now clamped into position and securely held there by the bolts 26. As in the construction shown in Figs. 1 and 2, the casing or relatively fixed part is provided at its top and bottom with the attaching flanges 18 by means of which the fixed parts may be secured to a lathe or the like upon which the shaft 10 is adapted to be mounted. The bearing surfaces of the rollers or pinions are preferably ground to within one-thousandth part of an inch so that the shaft will not vibrate unnecessarily during rotation. By the use of this improved bearing the shaft is permitted to run at a relatively high speed without burning out the parts or requiring excessive power to maintain such speed. The bearing is also of such a nature that it does not require oil but may be packed with grease at long intervals, such as once a month.

Various changes and modifications may be made in the specific construction of this bearing without departing from the spirit of the invention to adapt the same to various conditions of use, and to various conditions met with during installation of the device, the changes and modifications being restricted only by the limit of the following claims.

I claim:

1. In a roller bearing, the combination with a shaft, of a fixed casing surrounding the shaft and provided with an internal bearing surface and an internal rack, pinions in the casing bearing on said surface and engaging said rack, a gear wheel keyed on said shaft for engagement with said pinions, and a roller adapted for securement against the side of said gear wheel and for engagement with said pinions to support the shaft.

2. In a roller bearing, the combination with a shaft, of a fixed casing surrounding the shaft and provided with an internal rack and an internal bearing surface, pinions arranged in the casing bearing against said internal bearing surface and having teeth for engagement with said internal rack, a gear wheel detachably keyed on said shaft for intermeshing engagement with the pinions, and a roller carried upon the side of said gear wheel and adapted for engagement with the bearing portions of said pinions for supporting the shaft.

3. In a roller bearing, the combination with a shaft, of a gear keyed upon the shaft, a roller carried by the shaft adjacent to the gear, a plurality of pinions arranged about the gear and the roller and having roller and toothed portions engaging said roller and the gear, and a casing surrounding the shaft and the pinions and being adapted to retain the latter from longitudinal displacement from the roller, said casing comprising an intermediate ring having an internal rack engaging the teeth of the pinions, and end rings having inwardly inclined bearing surfaces engaging the roller portions of the pinions.

4. In a roller bearing, the combination with a shaft, of a gear wheel keyed to the shaft, a pair of rollers secured against the opposite sides of the gear wheel for rotation therewith and provided with peripheral bearing surfaces inclined toward the gear wheel, a plurality of pinions meshing with the gear wheel and arranged in planetary fashion thereabout, said pinions being provided upon their opposite ends with outwardly tapering bearing surfaces adapted for engagement with said rollers, and a longitudinally separable casing surrounding the shaft and the pinions, said casing provided in its opposite ends with internal inwardly inclined bearing surfaces adapted to receive the opposite ends of the pinions thereagainst to support the pinions and to retain the same from longitudinal shifting in the casing.

5. In a roller bearing, the combination with a shaft, a gear keyed to the shaft, rollers secured to the opposite sides of the gear, a plurality of pinions meshing with the gear and arranged in planetary fashion thereabout, and a casing surrounding said pinions and said shaft, said casing comprising intermediate and end rings, said intermediate ring having an internal rack adapted to mesh with said pinions, said end rings provided with bearing surfaces adapted to engage the opposite ends of the pinions to support the same and to hold the pinions, the gear wheel, and the shaft from longitudinal shifting, and means for detachably securing said rings together.

LEO H. CORMIER.

Copies of this patent may be obtained for five cents each, by addressing the "Commissioner of Patents, Washington, D. C."